(12) United States Patent
Yamada et al.

(10) Patent No.: US 10,110,358 B2
(45) Date of Patent: Oct. 23, 2018

(54) BASE-STATION DEVICE, TERMINAL DEVICE, AND COMMUNICATION METHOD USING CRS ASSISTANCE INFORMATION

(71) Applicant: Sharp Kabushiki Kaisha, Sakai, Osaka (JP)

(72) Inventors: Ryota Yamada, Sakai (JP); Takashi Yoshimoto, Sakai (JP); Kazuyuki Shimezawa, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 22 days.

(21) Appl. No.: 15/316,948

(22) PCT Filed: May 29, 2015

(86) PCT No.: PCT/JP2015/065506
§ 371 (c)(1),
(2) Date: Dec. 7, 2016

(87) PCT Pub. No.: WO2015/190312
PCT Pub. Date: Dec. 17, 2015

(65) Prior Publication Data
US 2017/0126383 A1    May 4, 2017

(30) Foreign Application Priority Data
Jun. 10, 2014    (JP) .................................. 2014-119166

(51) Int. Cl.
*H04L 12/28*    (2006.01)
*H04L 5/00*    (2006.01)
(Continued)

(52) U.S. Cl.
CPC .......... *H04L 5/0051* (2013.01); *H04L 5/0007* (2013.01); *H04L 5/0073* (2013.01); *H04W 72/0446* (2013.01)

(58) Field of Classification Search
USPC ................................ 370/252, 278, 329, 430
See application file for complete search history.

(56) References Cited

U.S. PATENT DOCUMENTS

| 2013/0182583 A1* | 7/2013 | Siomina et al. ...... H04W 24/00 370/252 |
| 2015/0092768 A1* | 4/2015 | Ng ........................ H04W 48/16 370/350 |

(Continued)

OTHER PUBLICATIONS

Official Communication issued in International Patent Application No. PCT/JP2015/065506, dated Aug. 11, 2015.
(Continued)

*Primary Examiner* — John Pezzlo
(74) *Attorney, Agent, or Firm* — Keating & Bennett, LLP

(57) ABSTRACT

By effective knowledge or information about an interfering signal, interference is mitigated. A base-station apparatus communicating with a terminal apparatus includes a higher layer processing circuitry that configures, to the terminal apparatus, CRS assistance information used by the terminal apparatus to mitigate interference from a cell-specific reference signal, in which in a case where a predetermined parameter including information about a DL/UL subframe configuration and information about a MBSFN subframe is configured, the higher layer processing circuitry does not configure the CRS assistance information to the terminal apparatus.

20 Claims, 3 Drawing Sheets

(51) Int. Cl.
*H04W 72/04* (2009.01)
*H04J 1/16* (2006.01)

(56) References Cited

U.S. PATENT DOCUMENTS

2017/0366316 A1* 12/2017 Kim ...................... H04L 5/0048
2018/0014257 A1* 1/2018 Ouchi ................... H04W 52/40

OTHER PUBLICATIONS

MediaTek et al., "Study on Network Assisted Interference Cancellation and Suppression for LTE", 3GPP TSG RAN Meeting #59, RP-130404, Vienna, Austria, Feb. 26-Mar. 1, 2013.
Ericsson, "NAICS parameters", 3GPP TSG-RAN WG2 #87, R2-143509, Dresden, Germany, Aug. 18-22, 2014.
Ericsson, "NAICS functionality, robustness, and configurability", 3GPP TSG-RAN WG1#77, R1-142322, May 19-23, 2014, 5 pages.
Intel Corporation, "Discussion on NAICS interference semi-static parameters blind detection and signalling", 3GPP TSG-RAN WG4 Meeting #71, R4-143034, May 19-23, 2014, pp. 1-6.

* cited by examiner

BASE-STATION DEVICE, TERMINAL DEVICE, AND COMMUNICATION METHOD USING CRS ASSISTANCE INFORMATION

TECHNICAL FIELD

The present invention relates to a base-station apparatus, a terminal apparatus, and a communication method.

BACKGROUND ART

In communication systems such as WCDMA (registered trademark) (Wideband Code Division Multiple Access), LTE (Long Term Evolution), LTE-A (LTE-Advanced), and WiMAX (Worldwide Interoperability for Microwave Access) by 3GPP (Third Generation Partnership Project), it is possible to increase a communication area by a cellular configuration in which a plurality of areas each of which is covered by a base-station apparatus (base station, transmission station, transmission point, downlink transmission apparatus, uplink reception apparatus, transmit antenna group, transmit antenna port group, component carrier, eNodeB) or a transmission station conforming to the base-station apparatus are arranged in a cell shape. In this cellular configuration, it is possible to enhance frequency efficiency by using the same frequency between neighbor cells or sectors.

In such a cellular configuration, however, a terminal apparatus (mobile station apparatus, reception station, reception point, uplink transmission apparatus, downlink reception apparatus, mobile terminal, receive antenna group, receive antenna port group, UE; User Equipment) which is in a cell edge area or a sector edge area receives interference from a transmission signal of a base-station apparatus forming another cell or another sector (inter-cell interference, inter-sector interference), so that there is a problem of lowering frequency efficiency.

As a countermeasure for the inter-cell interference and the inter-sector interference, advanced reception capability (advanced receiver) of a terminal apparatus is cited. For example, NPL 1 indicates a MMSE-IRC (Minimum Mean Square Error-Interference Rejection Combining) receiver, an interference cancellation receiver, an interference suppression receiver, a MLD (Maximum Likelihood Detection) receiver, and the like as the advanced receiver. They make it possible to alleviate limitation by the inter-cell interference or the like, so that improvement in frequency efficiency is able to be achieved.

Spatial multiplexing (MIMO: Multi Input Multi Output) is applied in order to realize efficient data transmission in the aforementioned communication systems. It is possible to achieve improvement in frequency efficiency by using the aforementioned advanced receiver for suppressing inter-stream interference (inter-layer interference, inter-antenna interference) generated in the spatial multiplexing.

CITATION LIST

Non Patent Literature

NPL 1: "Study on Network Assisted Interference Cancellation and Suppression for LTE," 3GPP TSG RAN Meeting #59, RP-130404, March 2013.

SUMMARY OF INVENTION

Technical Problem

The aforementioned advanced receiver needs knowledge or information about an interfering signal (for example, a parameter for demodulation) to mitigate interference. However, when a base-station apparatus transmits knowledge or information about an interfering signal to a terminal apparatus, there is a problem of increasing overhead of signaling. Further, when there is little knowledge or information about the interfering signal from the base-station apparatus to the terminal apparatus, the information of the interfering signal needs to be estimated on the terminal apparatus side, thus posing a problem of increasing a computation amount of the terminal apparatus.

The invention has been made in view of such circumstances, and an object thereof is to provide a base-station apparatus, a terminal apparatus, and a communication method that are able to mitigate interference by using effective knowledge or information of an interfering signal.

Solution to Problem

Configurations of a terminal apparatus and an integrated circuit according to the invention for solving the aforementioned problems are as follows.

A base-station apparatus of the invention is a base-station apparatus communicating with a terminal apparatus, including: a higher layer that configures, to the terminal apparatus, first interference information used by the terminal apparatus to mitigate interference from a cell-specific reference signal and/or second interference information used by the terminal apparatus to mitigate at least interference from a downlink shared channel, in which the first interference information includes one or more pieces of first assist information and the second interference information includes one or more pieces of second assist information.

In the base-station apparatus of the invention, the second interference information is configured only in a case where the first interference information is configured.

In the base-station apparatus of the invention, each of the first assist information includes a first cell identity for the cell-specific reference signal and each of the second assist information includes a second cell identity for the downlink shared channel.

In the base-station apparatus of the invention, the second assist information is associated with the first assist information including the first cell identity having the same value as that of the second cell identity.

In the base-station apparatus of the invention, the first interference information and the second interference information are not configured at the same time.

In the base-station apparatus of the invention, the second interference information is further used by the terminal apparatus to mitigate interference from a cell-specific reference signal.

In the base-station apparatus of the invention, each of the first assist information includes a first cell identify for the cell-specific reference signal and each of the second assist information includes a first cell identity for the cell-specific reference signal and a second cell identity for the downlink shared channel.

In the base-station apparatus of the invention, each of the first assist information includes a first cell identify for the cell-specific reference signal and each of the second assist information includes a second cell identify for the cell-specific reference signal and the downlink shared channel.

A terminal apparatus of the invention is a terminal apparatus communicating with a base-station apparatus, including: a higher layer by which first interference information used by the terminal apparatus to mitigate interference from a cell-specific reference signal and/or second interference information used by the terminal apparatus to mitigate at least interference from a downlink shared channel are configured from the base-station apparatus, in which the first interference information includes one or more pieces of first assist information and the second interference information includes one or more pieces of second assist information.

In the terminal apparatus of the invention, the second interference information is configured only in a case where the first interference information is configured.

In the terminal apparatus of the invention, each of the first assist information includes a first cell identity for the cell-specific reference signal and each of the second assist information includes a second cell identity for the downlink shared channel.

In the terminal apparatus of the invention, the second assist information is associated with the first assist information including the first cell identity having the same value as that of the second cell identity.

In the terminal apparatus of the invention, the first interference information and the second interference information are not configured at the same time.

In the terminal apparatus of the invention, the second interference information is further used by the terminal apparatus to mitigate interference from a cell-specific reference signal.

In the terminal apparatus of the invention, each of the first assist information includes a first cell identify for the cell-specific reference signal and each of the second assist information includes a first cell identity for the cell-specific reference signal and a second cell identity for the downlink shared channel.

In the terminal apparatus of the invention, each of the first assist information includes a first cell identify for the cell-specific reference signal and each of the second assist information includes a second cell identify for the cell-specific reference signal and the downlink shared channel.

An integrated circuit mounted in a terminal apparatus of the invention includes means by which first interference information used by the terminal apparatus to mitigate interference from a cell-specific reference signal and/or second interference information used by the terminal apparatus to mitigate at least interference from a downlink shared channel are configured from the base-station apparatus, in which the first interference information includes one or more pieces of first assist information and the second interference information includes one or more pieces of second assist information.

Advantageous Effects of Invention

According to the invention, it is possible to effectively mitigate interference in a radio environment in which an interfering signal is delivered.

DESCRIPTION OF EMBODIMENTS

A communication system in the present embodiment includes a base-station apparatus (transmission apparatus, cell, transmission point, transmit antenna group, transmit antenna port group, component carrier, eNodeB) and a terminal apparatus (terminal, mobile terminal, reception point, reception terminal, reception apparatus, receive antenna group, receive antenna port group, UE).

In the present embodiment, "X/Y" includes a meaning of "X or Y". In the present embodiment, "X/Y" includes a meaning of "X and Y". In the present embodiment, "X/Y" includes a meaning of "X and/or Y".

Figure 1:
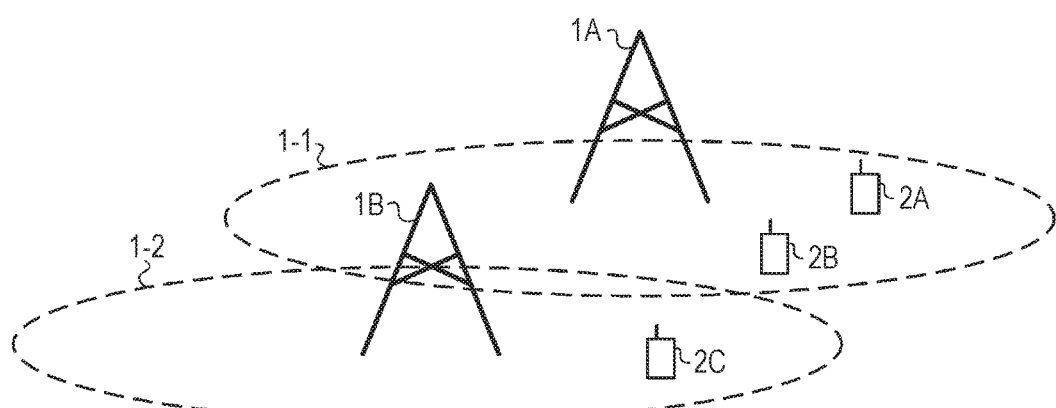
FIG. 1 illustrates an example of a communication system according to the present embodiment.

FIG. 1 illustrates an example of the communication system according to the present embodiment. As illustrated in FIG. 1, the communication system in the present embodiment includes base-station devises 1A and 1B, and terminal apparatuses 2A, 2B and 2C. A coverage 1-1 is a range in which the base-station apparatus 1A is able to be connected to the terminal apparatuses (communication area). A coverage 1-2 is a range in which the base-station apparatus 1B is able to be connected to the terminal apparatus (communication area). The terminal apparatuses 2A and 2B are also described as a terminal apparatus 2 below.

In FIG. 1, when the base-station apparatus 1A performs spatial multiplexing with the terminal apparatus 2A and the terminal apparatus 2B or when the terminal apparatus 2 receives inter-cell interference from the base-station apparatus 1B, a reception signal in the terminal apparatus 2 includes a desired signal addressed to the own terminal apparatus (which is also referred to as a first terminal apparatus) and a signal addressed to an interfering terminal apparatus (which is also referred to as a second terminal apparatus). Specifically, a reception signal in the terminal apparatus 2A includes a desired signal addressed to the own terminal apparatus and a signal addressed to the terminal apparatus 2B, which are transmitted from the base-station apparatus 1A, and an interfering signal which is a signal transmitted from the base-station apparatus 1B to the terminal apparatus 2C. Moreover, a reception signal in the terminal apparatus 2B includes a desired signal addressed to the own terminal apparatus and a signal addressed to the terminal apparatus 2A, which are transmitted from the base-station apparatus 1A, and an interfering signal which is a signal transmitted from the base-station apparatus 1B to the terminal apparatus 2C.

In this manner, the present embodiment is only required to be used in a case where a base-station apparatus performs spatial multiplexing with a plurality of terminal apparatuses so that the terminal apparatuses receive inter-user interference or receive inter-cell interference from a different base-station apparatus, and is not limited to the communication system of FIG. 1. Further, the inter-user interference and the inter-cell interference do not need to be received simultaneously, and both a case where only the inter-user interference is received and a case where only the inter-cell interference is received are also included in the invention.

In FIG. 1, following uplink physical channels are used in uplink radio communication from the terminal apparatus 2 to the base-station apparatus 1A. The uplink physical channels are used to transmit information output from a higher layer.

PUCCH (Physical Uplink Control Channel)
PUSCH (Physical Uplink Shared Channel)
PRACH (Physical Random Access Channel)

The PUCCH is used to transmit uplink control information (UCI). Here, the uplink control information includes ACK (a positive acknowledgement) or NACK (a negative acknowledgement) (ACK/NACK) with respect to downlink data (downlink transport block, Downlink-Shared Channel:

DL-SCH). The ACK/NACK with respect to the downlink data is also referred to as HARQ-ACK or HARQ feedback.

The uplink control information also includes channel state information (CSI) for downlink. The uplink control information further includes a scheduling request (SR) used to request a resource of an Uplink-Shared Channel (UL-SCH). A rank indicator RI for designating a suitable spatial multiplexing number, a precoding matrix indicator PMI for designating a suitable precoder, a channel quality indicator CQI for designating a suitable transmission rate, and the like correspond to the channel state information.

The channel quality indicator CQI (hereinafter, a CQI value) is able to be set as a suitable modulation scheme (for example, such as QPSK, 16QAM, 64QAM, or 256QAM) in a predetermined band (details thereof will be described below) or a code rate. The CQI value is able to be set as an index (CQI index) defined according to the changing scheme and the code rate. The CQI value is able to be set as one defined in advance in the corresponding system.

Note that, the rank indicator and the precoding quality indicator are able to be set as ones defined in advance in the system. The rank indicator and the precoding matrix indicator are able to be set as indexes defined according to a spatial multiplexing number and precoding matrix information, respectively. Note that, values of the rank indicator, the precoding matrix indicator, the channel quality indicator CQI are collectively referred to as CSI values.

The PUSCH is used to transmit uplink data (uplink transport block, UL-SCH). The PUSCH may be used to transmit ACK/NACK and/or channel state information together with the uplink data. The PUSCH may be used to transmit only uplink control information.

The PUSCH is also used to transmit a RRC message. The RRC message is information/signal processed in a radio resource control (RRC) layer. The PUSCH is further used to transmit MAC CE (Control Element). Here, the MAC CE is information/signal processed (transmitted) in a medium access control (MAC) layer.

For example, a power headroom may be included in the MAC CE and reported via the PUSCH. That is, a field of the MAC CE may be used to indicate a level of the power headroom.

The PRACH is used to transmit random access preamble.

In uplink radio communication, an uplink reference signal (UL RS) is used as an uplink physical signal. The uplink physical signal is not used to transmit information output from a higher layer but used by a physical layer. Here, the uplink reference signal includes a DMRS (Demodulation Reference Signal) and a SRS (Sounding Reference Signal).

The DMRS is associated with transmission of the PUSCH or the PUCCH. For example, the base-station apparatus 1A uses the DMRS to perform channel correction of the PUSCH or the PUCCH. The SRS is not associated with transmission of the PUSCH or the PUCCH. For example, the base-station apparatus 1A uses the SRS to measure an uplink channel state.

In FIG. 1, following downlink physical channels are used in downlink radio communication from the base-station apparatus 1A to the terminal apparatus 2. The downlink physical channels are used to transmit information output from a higher layer.

PBCH (Physical Broadcast Channel; broadcast channel)
PCFICH (Physical Control Format Indicator Channel; control format indicator channel)
PHICH (Physical Hybrid automatic repeat request Indicator Channel; HARQ indicator channel)
PDCCH (Physical Downlink Control Channel; downlink control channel)
EPDCCH (Enhanced Physical Downlink Control Channel; enhanced downlink control channel)
PDSCH (Physical Downlink Shared Channel; downlink shared channel)

The PBCH is used to broadcast a master information block (MIB, Broadcast Channel; BCH) used commonly in the terminal apparatuses 2. The PCFICH is used to transmit information for indicating a region used for transmission of the PDCCH (for example, the number of OFDM symbols).

The PHICH is used to transmit ACK/NACK with respect to uplink data (transport block, code word) received by the base-station apparatus 1A. That is, the PHICH is used to transmit HARQ indicator indicating ACK/NACK with respect to the uplink data (HARQ feedback). The ACK/NACK is also referred to as HARQ-ACK. The terminal apparatus 2 notifies a higher layer of the received ACK/NACK. The ACK/NACK includes ACK indicating that reception is performed correctly, NACK indicating that reception is not performed correctly, and DTX indicting that there is no corresponding data. When there is no PHICH corresponding to the uplink data, the terminal apparatus 2 notifies the higher layer of ACK.

The PDCCH and the EPDCCH are used to transmit downlink control information (DCI). Here, a plurality of DCI formats are defined in transmission of the downlink control information. That is, a field with respect to the downlink control information is defined in a DCI format and mapped to information bit.

For example, as the DCI format for downlink, a DCI format 1A which is used for scheduling of one PDSCH in one cell (transmission in one downlink transport block) is defined.

For example, the DCI format for downlink includes information about resource allocation of the PDSCH, information about MCS (Modulation and Coding Scheme) for the PDSCH, and downlink control information such as a TPC command to the PUCCH. Here, the DCI format for downlink is also referred to as a downlink grant (or downlink assignment).

Moreover, as the DCI format for uplink, for example, a DCI format 0 which is used for scheduling of one PUSCH in one cell (transmission in one uplink transport block) is defined.

For example, the DCI format for uplink includes information about resource allocation of the PUSCH, information about MCS for the PUSCH, and uplink control information such as a TPC command to the PUSCH. Here, the DCI format for uplink is also referred to as an uplink grant (or uplink assignment).

The DCI format for uplink is able to be used to request downlink channel state information (CSI, also referred to as reception quality information) (CSI request). A rank indicator RI for designating a suitable spatial multiplexing number, a precoding matrix indicator PMI for designating a suitable precoder, a channel quality indicator CQI for designating a suitable transmission rate, and the like correspond to the channel state information.

The DCI format for uplink is able to be used for a configuration indicating an uplink resource in which channel state information report (CSI feedback report) to be fed back from a terminal apparatus to a base-station apparatus is mapped. For example, the channel state information report is able to be used for a configuration indicating an uplink resource in which channel state information (Periodic CSI) is periodically reported. The channel state information report is able to be used for a mode configuration for periodically reporting channel state information (CSI report mode).

For example, the channel state information report is able to be used for a configuration indicating an uplink resource in which aperiodic channel state information (Aperiodic CSI) is reported. The channel state information report is able to be used for a mode configuration for aperiodically reporting channel state information (CSI report mode). The base-station apparatuses 100-1 and 100-2 are able to configure either the periodic channel state information report or the aperiodic channel state information report. The base-station apparatuses 100-1 and 100-2 are also able to configure both of the periodic channel state information report and the aperiodic channel state information report.

The DCI format for uplink is able to be used for a configuration indicating a type of channel state information report to be fed back from a terminal apparatus to a base-station apparatus. As the type of channel state information report, there are a wideband CSI (for example, Wideband CQI), a narrow band CSI (for example, Subband CQI), and the like.

The DCI format for uplink is able to be used for a mode configuration including the periodic channel state information report or the aperiodic channel state information report, and the type of the channel state information report. Examples thereof include a mode in which the aperiodic channel state information report and the wideband CSI are reported, a mode in which the aperiodic channel state information report and the narrowband CSI are reported, a mode in which the aperiodic channel state information report, and the wideband CSI and the narrowband CSI are reported, a mode in which the periodic channel state information report and the wideband CSI are reported, a mode in which the periodic channel state information report and the narrowband CSI are reported, and a mode in which the periodic channel state information report, and the wideband CSI and the narrowband CSI are reported.

When a resource of the PDSCH is scheduled by using the downlink assignment, the terminal apparatus 2 receives downlink data in the scheduled PDSCH. When a resource of the PUSCH is scheduled by using the uplink grant, the terminal apparatus 2 transmits uplink data and/or uplink control information in the scheduled PUSCH.

The PDSCH is used to transmit downlink data (downlink transport block, DL-SCH). The PDSCH is also used to transmit a message of a system information block type 1. The message of the system information block type 1 is cell-specific information.

The PDSCH is used to transmit a system information message. The system information message includes a system information block X other than the system information block type 1. The system information message is cell-specific information.

The PDSCH is used to transmit a RRC message. Here, the RRC message transmitted from the base-station apparatus 1A may be common in a plurality of terminal apparatuses 2 in a cell. The RRC message transmitted from the base-station apparatus 1A may be a dedicated message (also referred to as dedicated signaling) for a certain terminal apparatus 2. That is, information specific to a user apparatus is transmitted by using a desiccated message to a certain terminal apparatus 2. The PDSCH is also used to transmit MAC CE.

Here, the RRC message and/or the MAC CE are also referred to as a higher layer signal (higher layer signaling).

The PDSCH is able to be used to request downlink channel state information. The PDSCH is also able to be used to transmit an uplink resource in which channel state information report (CSI feedback report) to be fed back from a terminal apparatus to a base-station apparatus is mapped. For example, the channel state information report is able to be used for a configuration indicating an uplink resource in which channel state information (Periodic CSI) is periodically reported. The channel state information report is able to be used for a mode configuration for periodically reporting channel state information (CSI report mode).

As the type of channel state information report of downlink, there are a wideband CSI (for example, Wideband CSI) and a narrowband CSI (for example, Subband CSI). In the wideband CSI, one piece of channel state information is calculated for a system band of a cell. In the narrowband CSI, a system band is divided into sections in a predetermined unit and one piece of channel state information is calculated for each section.

In downlink radio communication, a synchronization signal (SS) and a downlink reference signal (DL RS) are used as downlink physical signals. The downlink physical signals are not used to transmit information output from a higher layer but used by a physical layer.

The synchronization signal is used to synchronize a frequency domain and a time domain of downlink. The downlink reference signal is used by the terminal apparatus 2 to perform channel correction of the downlink physical channel. For example, the downlink reference signal is used by the terminal apparatus 2 to calculate downlink channel state information.

Here, the downlink reference signal includes a CRS (Cell-specific Reference Signal), a URS (UE-specific Reference Signal; terminal-specific reference signal) associated with the PDSCH, a DMRS (Demodulation Reference Signal) associated with the EPDCCH, a NZP CSI-RS (Non-Zero Power Channel State Information-Reference Signal), and a ZP CSI-RS (Zero Power Channel State Information-Reference Signal).

The CRS is transmitted in an entire band of a subframe, and is used to perform demodulation of the PBCH/PDCCH/PHICH/PCFICH/PDSCH. The URS associated with the PDSCH is transmitted in a subframe and a band used for transmission of the PDSCH associated with the URS, and is used to perform demodulation of the PDSCH associated with the URS.

The DMRS associated with the EPDCCH is transmitted in a subframe and a band used for transmission of the EPDCCH associated with the DMRS. The DMRS is used to perform demodulation of the EPDCCH associated with the DMRS.

A resource of the NZP CSI-RS is configured by the base-station apparatus 1A. For example, the terminal apparatus 2 performs measurement of a signal (channel measurement) by using the NZP CSI-RS. A resource of the ZP CSI-RS is configured by the base-station apparatus 1A. The base-station apparatus 1A transmits the ZP CSI-RS with zero power. For example, the terminal apparatus 2 performs measurement of interference in the resource to which the NZP CSI-RS corresponds.

The resource of the ZP CSI-RS is configured by the base-station apparatus 1A. The base-station apparatus 1B transmits the ZP CSI-RS with zero power. That is, the base-station apparatus 1A does not transmit the ZP CSI-RS. The base-station apparatus 1B does not transmit the PDSCH or the EPDCCH in the configured resource of the ZP CSI-RS. For example, the terminal apparatus 2C is able to measure interference in the resource to which the NZP CSI-RS corresponds in a certain cell.

The MBSFN (Multimedia Broadcast multicast service Single Frequency Network) RS is transmitted in an entire band of a subframe used for transmission of the PMCH. The MBSFN RS is used to perform demodulation of the PMCH. The PMCH is transmitted by an antenna port used for transmission of the MBSFN RS.

A downlink physical channel and a downlink physical signal are collectively referred to also as a downlink signal. An uplink physical channel and an uplink physical signal are collectively referred to also as an uplink signal. A downlink physical channel and an uplink physical channel are collectively referred to also as a physical channel. A downlink physical signal and an uplink physical signal are collectively referred to also as a physical signal.

The BCH, the UL-SCH, and the DL-SCH are transport channels. A channel used in a MAC layer is referred to as a transport channel. A unit of the transport channel used in the MAC layer is also referred to as a transport block (TB) or a MAC PDU (Protocol Data Unit). The transport block is a unit of data delivered to the physical layer from the MAC layer. In the physical layer, the transport block is mapped to a code word and coding processing or the like is performed for each code word.

The terminal apparatus is able to have a function of canceling or suppressing inter-user interference or inter-cell interference. Such a technique has been studied as NAICS (Network Assisted Interference Cancellation and Suppression) in the 3GPP (3rd Generation Partnership Project). In the NAICS, the base-station apparatus transmits NAICS assistance information (also referred to as second assistance information) used by the terminal apparatus for handling, cancelation, or suppression of an interfering signal. The terminal apparatus receives the NAICS assistance information, detects a parameter for cancelling or suppressing the interfering signal based on the NAICS assistance information, and cancels or suppresses the interfering signal by using the parameter. The NAICS assistance information includes a part or all of a cell ID, the number of CRS antenna ports, a MBSFN subframe pattern, PB, a virtual cell ID, a scrambling identity (nSCID), PA, a transmission mode, QCL information (quasi co-location information), a ZP/NZP CSI-RS configuration, a PDSCH starting position, a TDD UL/DL configuration, precoding matrix indicator/rank indicator, a modulation scheme, and resource allocation information.

Note that, the PA is a power ratio of the PDSCH to the CRS in an OFDM symbol in which no CRS is arranged. The PB represents a power ratio of the PDSCH in an OFDM symbol in which the CRS is arranged to the PDSCH in an OFDM symbol in which no CRS is arranged. The QCL information is information about QCL for a predetermined antenna port, a predetermined signal, or a predetermined channel. In a case where, long-term features of a channel in which a symbol on one antenna port of two antenna ports is carried are able to be estimated from a channel in which a symbol on the other antenna port is carried, these antenna ports are referred to as QCL. The long-term features include delay spread, Doppler spread, Doppler shift, average gain and/or average delay. That is, when the two antenna ports are QCL, the terminal apparatus is able to consider that the long-term features in the antenna ports are the same.

Note that, one value (candidate) may be configured or a plurality of values (candidates) may be configured to each of the parameters included in the NAICS assistance information. When a plurality of values are set, the terminal apparatus interprets that values which may be configured by an interfering base-station apparatus are indicated for the parameter and detects the parameter configured to an interfering signal from the plurality of values. The NAICS assistance information indicates information of another base-station apparatus in some cases and indicates information of the own base-station apparatus in other cases.

Note that, the NAICS assistance information is used by a terminal apparatus when demodulating the PDSCH for the terminal apparatus in order to perform handling, cancelation, or suppression of interference from the PDSCH to a different terminal apparatus. Thus, the NAICS assistance information is also referred to as PDSCH interference assist information or PDSCH assist information. The NAICS assistance information includes at least information about mapping of a resource element of the PDSCH for a different terminal apparatus. The NAICS assistance information may be used when various measurement is performed. The measurement includes RRM (Radio Resource Management) measurement, RLM (Radio Link Monitoring) measurement, and CSI (Channel State Information) measurement.

The terminal apparatus detects (specifies) PDSCH interference based on the configured NAICS assistance information to mitigate the detected PDSCH interference. The NAICS assistance information may include quasi-static control information which is not updated relatively frequently and may not include dynamic control information which is updated relatively frequently. The quasi-static control information includes a cell ID, the number of CRS antenna ports, a MBSFN subframe pattern, PB, a virtual cell ID, a scrambling identity (nSCID), PA, a transmission mode, QCL information (quasi co-location information), a ZP/NZP CSI-RS configuration, a PDSCH starting position, a TDD UL/DL configuration, and the like. The dynamic control information includes precoding matrix indicator/rank indicator, a modulation scheme, resource allocation information, and the like. As has been described, a plurality of values (candidates) may be configured to each of the parameters included in the NAICS assistance information. Thus, the NAICS assistance information is able to be regarded as information for indicating a plurality of candidates of PDSCH interference. The terminal apparatus is able to perform blind detection for trying detection in order for candidates of PDSCH interference, which are able to be recognized based on the NAICS assistance information.

Thereby, the terminal apparatus is able to mitigate interference by the PDSCH for a different terminal apparatus based on the parameter detected from the NAICS assistance information, thus making it possible to obtain a signal addressed to the own terminal apparatus accurately. Since the NICS assist information indicates a plurality of candidates, influence on scheduling of the base-station apparatus is able to be mitigated. Note that, it may be said that the terminal apparatus performs blind detection of a parameter which is not received as assist information. As the cancelation or suppression of the interfering signal, linear detection or non-linear detection is able to be performed. The linear detection allows detection in consideration of a channel of a desired signal addressed to the own terminal apparatus and a channel of an interfering signal addressed to a different terminal apparatus. Such linear detection is also called ELMMSE-IRC (Enhanced Linear Minimum Mean Square Error-Interference Rejection Combining). As the non-linear detection, interference canceller or maximum likelihood detection is able to be performed.

The base-station apparatus is able to transmit the NAICS assistance information as a list of a NAICS assistance information list. The NAICS assistance information list is able to include at least one piece of NAICS assistance information. The NAICS assistance information list is able to be transmitted as neighbor cell NAICS information (also referred to as second interference information). Note that, the NAICS assistance information list may be called a PDSCH assistance information list. The neighbor cell NAICS information may be called neighbor cell PDSCH information.

When a CRS transmitted from a different base-station apparatus causes interference, the terminal apparatus is able to mitigate interference received from the CRS of the different base-station apparatus by using CRS assistance information (also referred to as first assistance information) transmitted with a higher layer signal from the base-station apparatus. The CRS assistance information is information of the different base-station apparatus and includes a cell ID, the number of the CRS antenna ports, and a MBSFN subframe configuration list.

The CRS assistance information is transmitted as a list of a CRS assistance information list. The CRS assistance information list includes at least one piece of CRS assistance information. The CRS assistance information list is transmitted as neighbor cell CRS information (also referred to as first interference information).

Figure 2:
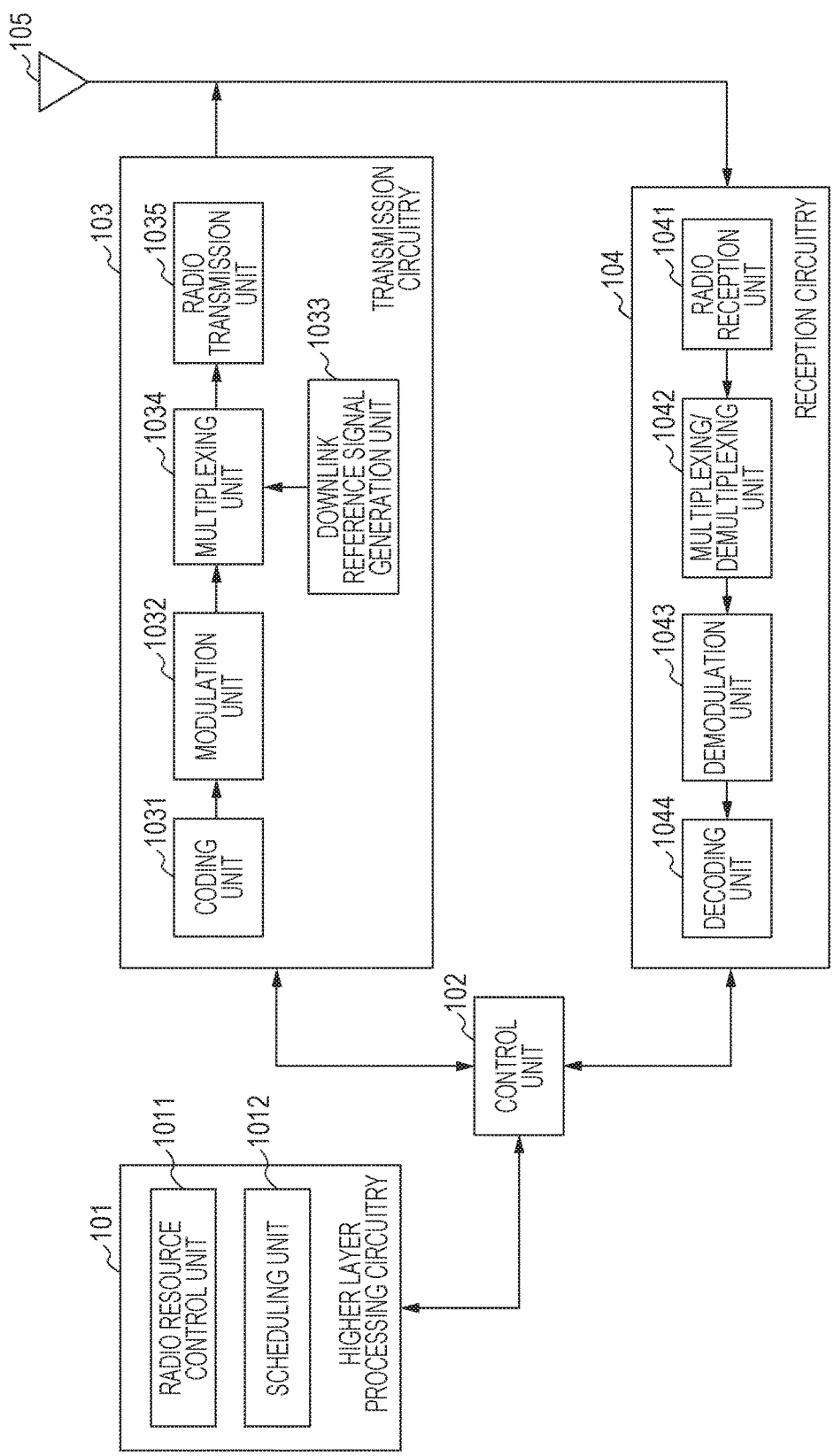
FIG. 2 is a block diagram illustrating a configuration example of a base-station apparatus according to the present embodiment.

FIG. 2 is a schematic block diagram illustrating a configuration of the base-station apparatus 1A in the present embodiment. As illustrated in FIG. 2, the base-station apparatus 1A includes a higher layer processing circuitry 101, a control unit 102, a transmission circuitry 103, a reception circuitry 104, and a transceiving antenna 105. In addition, the higher layer processing circuitry 101 includes a radio resource control unit 1011 and a scheduling unit 1012. In addition, the transmission circuitry 103 includes a coding unit 1031, a modulation unit 1032, a downlink reference signal generation unit 1033, a multiplexing unit 1034, and a radio transmission unit 1035. The reception circuitry 104 includes a radio reception unit 1041, a multiplexing/demultiplexing unit 1042, a demodulation unit 1043, and a decoding unit 1044.

The higher layer processing circuitry 101 performs processing in a medium access control (MAC) layer, a packet data convergence protocol (PDCP) layer, a radio link control (RLC) layer, and a radio resource control (RRC) layer. In addition, the higher layer processing circuitry 101 generates information necessary for controlling the transmission circuitry 103 and the reception circuitry 104, and outputs the resultant to the control unit 102.

The higher layer processing circuitry 101 determines whether or not to configure NAICS assistance information or whether or not to configure CRS assistance information.

The radio resource control unit 1011 generates, or acquires from a higher node, downlink data (transport blocks) to be arranged in the downlink PDSCH, system information, a RRC message, a MAC CE, and the like. The radio resource control unit 1011 outputs the downlink data to the transmission circuitry 103 and outputs other information to the control unit 102. The radio resource control unit 1011 manages various configuration information of the terminal apparatus 2. This configuration information is able to include configuration information of an interfering terminal apparatus. Alternatively, it is set that configuration information of an interfering terminal apparatus is able to be acquired from configuration information of the own terminal apparatus. In addition, configuration information of an interfering base-station apparatus is also able to be included.

The base-station apparatus is able to transmit NAICS assistance information and CRS assistance information, or NAICS assistance information to a terminal apparatus which has capability of performing NAICS and/or CRS interference cancellation. As a transmission method of the NAICS assistance information and the CRS assistance information, the following transmission methods are considered.

When the NAICS assistance information and the CRS assistance information are configured in a higher layer, considered is a method by which the base-station apparatus transmits the NAICS assistance information so as not to include information transmitted with the CRS assistance information in the NAICS assistance information. For associating the CRS assistance information with the NAICS assistance information, an index of the CRS assistance information included in a CRS assistance information list is able to be associated with an index of the NAICS assistance information included in a NAICS assistance information list. For example, when CRS assistance information 1 and CRS assistance information 2 are included in the CRS assistance information list and NAICS assistance information 1 and NAICS assistance information 2 are included in the NAICS assistance information list, the NAICS assistance information 1 is associated with the CRS assistance information 1, and the NAICS assistance information 2 is associated with the CRS assistance information 2. In this case, the terminal apparatus is able to perform handling of interference of the PDSCH based on information included in the NAICS assistance information 1 and the CRS assistance information 1. Note that, the number of pieces of the CRS assistance information included in the CRS assistance information list and the number of pieces of the NAICS assistance information included in the NAICS assistance information list may be the same or may be different.

For associating the NAICS assistance information with the CRS assistance information, a cell ID is able to be included in the CRS and NAICS assistance information. That is, the terminal apparatus is able to detect a cell ID included in the NAICS assistance information to acquire information about the CRS, that is, the number of CRS antenna ports and a MBSFN subframe configuration from the CRS assistance information associated with the cell ID. At this time, the terminal apparatus is able to cancel CRS interference based on the NAICS assistance information and the CRS assistance information to perform handling of an interfering signal of the PDSCH.

In a case where no CRS assistance information is included in the NAICS assistance information, only when the base-station apparatus transmits the CRS assistance information, the NAICS assistance information is able to be transmitted. That is, only when neighbor cell CRS information is configured, the base-station apparatus is able to configure neighbor cell NAICS information. Alternatively, when the neighbor cell NAICS information is configured, the base-station apparatus must configure (turns on) the neighbor cell CRS information.

The terminal apparatus is able to determine a subframe in which interference of the PDSCH is subjected to handling based on a subframe pattern or a subframe set for CRS interference cancellation, which is configured in a higher layer.

When the NAICS assistance information is configured and the CRS assistance information is not configured in the higher layer, considered is a method by which the base-station apparatus transmits information about a cell ID and a CRS by including the information in the NAICS assistance information. When the NAICS assistance information is configured and the CRS assistance information is not configured by a higher layer signal, the terminal apparatus is able to perform handling of interference associated with the PDSCH based on the NAICS assistance information and cancel CRS interference based on information about a CRS included in the NAICS assistance information. That is, in the case of the method for transmitting information about the CRS by including the information in the NAICS assistance information, the base-station apparatus is able to be set so as not to transmit the CRS assistance information when transmitting the NAICS assistance information. Alternatively, in the case of the method for transmitting information about the CRS by including the information in the NAICS assistance information, the base-station apparatus is able to be set so as not to transmit the NAICS assistance information when transmitting the CRS assistance information. That is, the base-station apparatus is able to configure the neighbor cell NAICS information only when the neighbor cell CRS information is not configured. Alternatively, the base-station apparatus does not configure (turns off) the neighbor cell CRS information when the neighbor cell NAICS information is configured.

The base-station apparatus is able to include the same cell ID or all different cell IDs in the CRS assistance information and the NAICS assistance information.

When the CRS assistance information is configured and the NAICS assistance information is not configured in the higher layer, the terminal apparatus is able to cancel CRS interference based on the CRS assistance information.

When the NAICS assistance information and the CRS assistance information are configured in the higher layer, the base-station apparatus is able to perform a configuration so that the cell ID included in the NAICS assistance information is different from the cell ID included in the CRS assistance information. At this time, the terminal apparatus is able to perform handling of CRS interference and PDSCH interference based on information about the CRS configured in the NAICS assistance information and further cancel CRS interference from a different base-station apparatus in addition to the CRS interference cancelled based on the NAICS assistance information.

The scheduling unit 1012 determines frequencies and subframes to which physical channels (PDSCH and PUSCH) are to be allocated, a code rate and a modulation scheme (or MCS) of the physical channels (PDSCH and PUSCH), transmit power, and the like. The scheduling unit 1012 outputs determined information to the control unit 102.

The scheduling unit 1012 generates information used for scheduling of the physical channels (PDSCH and PUSCH) based on a scheduling result. The scheduling unit 1012 outputs generated information to the control unit 102. In the present embodiment, as one example, the scheduling unit 1012 performs scheduling of the terminal apparatus 2A and the terminal apparatus 2B in the same resource. Note that, though the same resource is used for simplification in the present embodiment, the scheduling may be performed in different resources. Note that, the scheduling is also able to be performed in cooperation with the base-station apparatus 1B.

Based information input from the higher layer processing circuitry 101, the control unit 102 generates a control signal that controls the transmission circuitry 103 and the reception circuitry 104. The control unit 102 generates downlink control information based on the information input from the higher layer processing circuitry 101 and outputs the resultant to the transmission circuitry 103.

Following a control signal input from the control unit 102, the transmission circuitry 103 generates a downlink reference signal, codes and modulates a HARQ indicator, downlink control information, and downlink data input from the higher layer processing circuitry 101, multiplexes the PHICH, the PDCCH, the EPDCCH, the PDSCH, and the downlink reference signal, and transmits a signal to the terminal apparatus 2 via the transceiving antenna 105.

The coding unit 1031 codes the HARQ indicator, the downlink control information, and the downlink data input from the higher layer processing circuitry 101 by using a predetermined coding scheme, such as block coding, convolutional coding, or turbo coding, or alternatively, performs coding by using a coding scheme determined by the radio resource control unit 1011. The modulation unit 1032 modulates coded bits input from the coding unit 1031 according to a modulation scheme that is predetermined or determined by the radio resource control unit 1011, such as BPSK (Binary Phase Shift Keying), QPSK (quadrature Phase Shift Keying), 16QAM (quadrature amplitude modulation), 64QAM, or 256 QAM.

The downlink reference signal generation unit 1033 generates, as a downlink reference signal, a sequence known to the terminal apparatus 2 and obtained according to predetermined rules based on a physical cell identity (PCI, cell ID) or the like for identifying the base-station apparatus 1A.

The multiplexing unit 1034 multiplexes the modulated modulation symbols of each channel, the generated downlink reference signal and downlink control information. That is, the multiplexing unit 1034 arranges the modulated modulation symbols of each channel, the generated downlink reference signal and downlink control information into resource elements.

The radio transmission unit 1035 applies the Inverse Fast Fourier Transform (IFFT) to the multiplexed modulation symbols and the like to generate OFDM symbols, adds a cycle prefix (CP) to the OFDM symbols, generates a digital signal in a baseband, converts the digital signal in the baseband to an analog signal, removes excess frequency components by filtering, performs up-conversion to a carrier frequency, amplifies power, and outputs the resultant to the transceiving antenna 105 for transmission.

Following a control signal input from the control unit 102, the reception circuitry 104 demultiplexes, demodulates, and decodes a reception signal received from the terminal apparatus 2 via the transceiving antenna 105, and outputs decoded information to the higher layer processing circuitry 101.

The radio reception unit 1041 down-converts an uplink signal received via the transceiving antenna 105 to a baseband signal, removes unnecessary frequency components, controls an amplification level so that a signal level is suitably maintained, performs orthogonal demodulation based on in-phase components and orthogonal components of the received signal, and converts the orthogonally demodulated analog signal into a digital signal.

The radio reception unit 1041 removes a portion corresponding to CP from the converted digital signal. The radio reception unit 1041 applies the Fast Fourier Transform (FFT) to the signal from which the CP has been removed, extracts a signal in a frequency domain, and outputs it to the multiplexing/demultiplexing unit 1042.

The multiplexing/demultiplexing unit 1042 demultiplexes the signal input from the radio reception unit 1041 into signals such as the PUCCH, the PUSCH, and the uplink reference signal. Note that, this demultiplexing is performed based on radio resource allocation information included in an uplink grant which is determined by the radio resource control unit 1011 of the base-station apparatus 1A in advance and notified to each terminal apparatus 2.

The multiplexing/demultiplexing unit 1042 compensates channels of the PUCCH and PUSCH. In addition, the multiplexing/demultiplexing unit 1042 demultiplexes the uplink reference signal.

The demodulation unit 1043 applies the Inverse Discrete Fourier Transform (IDFT) to the PUSCH, acquires modulation symbols, and for each modulation symbol in the PUCCH and the PUSCH, demodulates the received signal by using a modulation scheme that is predetermined or notified in advance by the base-station apparatus 1A to each terminal apparatus 2 in the uplink grant, such as BPSK, QPSK, 16QAM, 64QAM, or 256QAM.

The decoding unit 1044 decodes coded bits of the demodulated PUCCH and PUSCH according to a predetermined coding scheme at a code rate that is predetermined or notified in advance by the base-station apparatus 1A to the terminal apparatus 2 in the uplink grant, and outputs the decoded uplink data and uplink control information to the higher layer processing circuitry 101. In a case where the PUSCH is retransmitted, the decoding unit 1044 performs decoding by using coded bits and demodulated coded bits that are held in a HARQ buffer input from the higher layer processing circuitry 101.

Figure 3:
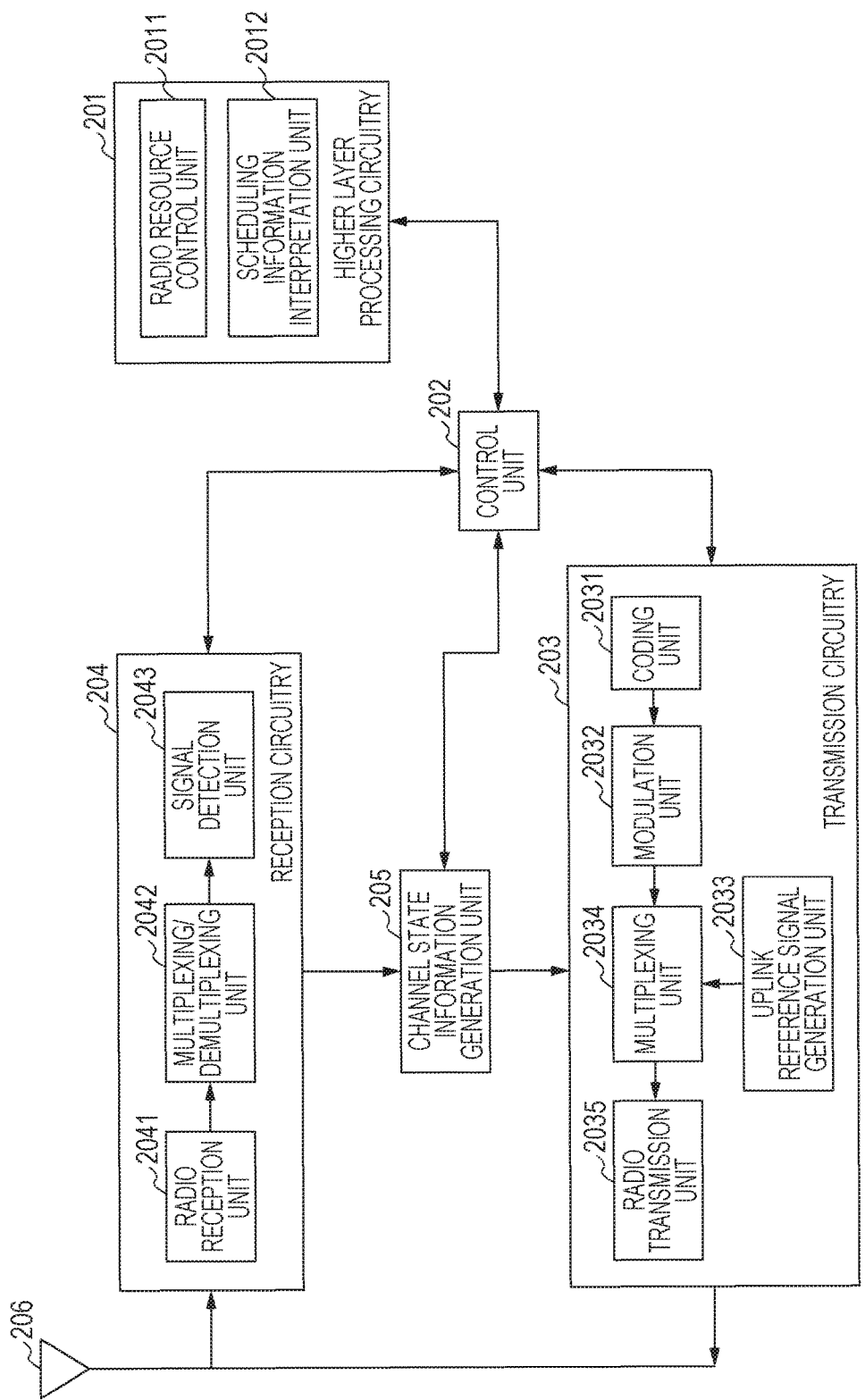
FIG. 3 is a block diagram illustrating a configuration example of a terminal apparatus according to the present embodiment.

FIG. 3 is a schematic block diagram illustrating a configuration of the terminal apparatus 2 in the present embodiment. As illustrated in FIG. 3, the terminal apparatus 2 includes a higher layer processing circuitry 201, a control unit 202, a transmission circuitry 203, a reception circuitry 204, a channel state information generation unit 205, and a transceiving antenna 206. The higher layer processing circuitry 201 includes a radio resource control unit 2011 and a scheduling information interpretation unit 2012. The transmission circuitry 203 includes a coding unit 2031, a modulation unit 2032, an uplink reference signal generation unit 2033, a multiplexing unit 2034, and a radio transmission unit 2035. The reception circuitry 204 includes a radio reception unit 2041, a multiplexing/demultiplexing unit 2042, and a signal detection unit 2043.

The higher layer processing circuitry 201 outputs uplink data (transport blocks) generated by a user operation or the like to the transmission circuitry 203. In addition, the higher layer processing circuitry 201 performs processing in a medium access control (MAC) layer, a packet data convergence protocol (PDCP) layer, a radio link control (RLC) layer, and a radio resource control (RRC) layer.

The radio resource control unit 2011 manages various configuration information of the terminal apparatus 2. The radio resource control unit 2011 generates information to be arranged in each uplink channel and outputs it to the transmission circuitry 203.

The radio resource control unit 2011 acquires configuration information about CSI feedback transmitted from the base-station apparatus and outputs it to the control unit 202.

The scheduling information interpretation unit 2012 interprets downlink control information received through the reception circuitry 204, and judges scheduling information. The scheduling information interpretation unit 2012 generates control information for controlling the reception circuitry 204 and the transmission circuitry 203 based on the scheduling information, and outputs it to the control unit 202.

Based on the information input from the higher layer processing circuitry 201, the control unit 202 generates a control signal that controls the reception circuitry 204, the channel state information generation unit 205, and the transmission circuitry 203. The control unit 202 outputs the generated control signal to the reception circuitry 204, the channel state information generation unit 205, and the transmission circuitry 203, and controls the reception circuitry 204 and the transmission circuitry 203.

The control unit 202 controls the transmission circuitry 203 to transmit CSI generated by the channel state information generation unit 205 to the base-station apparatus.

In accordance with a control signal input from the control unit 202, the reception circuitry 204 demultiplexes, demodulates, and decodes a reception signal received from the base-station apparatus 1A via the transceiving antenna 206 and outputs the decoded information to the higher layer processing circuitry 201. The reception circuitry 204 receives a reference signal corresponding to the base-station apparatus 1A (also referred to as a first reference signal) and a reference signal based on interference information configured by the base-station apparatus 1A (also referred to as a second reference signal) which are included in the reception signal, and outputs them to the channel state information generation unit 205.

The radio reception unit 2041 converts a downlink signal received via the transceiving antenna 206 to a baseband signal by down-conversion, removes unnecessary frequency components, controls an amplification level so that a signal level is suitably maintained, conducts orthogonal demodulation based on in-phase components and orthogonal components of the received signal, and converts the orthogonally demodulated analog signal into a digital signal.

The radio reception unit 2041 removes a portion corresponding to CP from the converted digital signal, applies the Fast Fourier Transform to the signal from which the CP has been removed, and extracts a signal in a frequency domain.

The multiplexing/demultiplexing unit 2042 demultiplexes the extracted signal into the PHICH, the PDCCH, the EPDCCH, the PDSCH, and the downlink reference signal. Moreover, the multiplexing/demultiplexing unit 2042 compensates channels of the PHICH, the PDCCH, and the EPDCCH based on estimated channel values of a desired signal obtained from channel measurement, detects downlink control information, and outputs it to the control unit 202. In addition, the control unit 202 outputs estimated channel values of the desired signal and the PDSCH to the signal detection unit 2043.

The signal detection unit 2043 detects a signal by using the PDSCH and the estimated channel values and outputs it to the higher layer processing circuitry 201. When the NAICS is configured in the higher layer, cancelation or suppression of an interfering signal is performed and a signal is detected. As the cancelation or suppression of an interfering signal, for example, linear detection in consideration of an estimated channel value of an interfering signal, or interference cancellation or maximum likelihood detection in consideration of an estimated channel value of an interfering signal and a modulation scheme is performed.

When the NAICS assistance information and the CRS assistance information are configured in the higher layer, the signal detection unit 2043 detects parameters needed for estimation of an interfering channel and/or demodulation of an interfering signal based on the NAICS assistance information and the CRS assistance information associated with a cell ID included in the NAICS assistance information. As to a parameter to which a plurality of values are configured in the NAICS assistance information, the plurality of values are set as candidates and a value configured to the interfering signal is obtained by blind detection. As to a parameter not configured in the NAICS assistance information and the CRS assistance information, values which may be configured in a system are set as candidates and a value configured to the interfering signal is obtained by blind detection. The signal detection unit 2043 is able to cancel or suppress the interference of the PDSCH by using the detected parameters. It is also possible to cancel CRS interference based on the CRS assistance information.

When the NAICS assistance information is configured and the CRS assistance information is not configured in the higher layer, the signal detection unit 2043 detects parameters needed for channel estimation of an interfering signal and/or demodulation of an interfering signal based on the NAICS assistance information. As to a parameter to which a plurality of values are configured in the NAICS assistance information, the plurality of values are set as candidates and a value configured to the interfering signal is obtained by blind detection. A parameter not configured in the NAICS assistance information is obtained by blind detection. Moreover, even when the CRS assistance information is not configured, the CRS interference is cancelled based on information about the CRS included in the NAICS assistance information.

When the CRS assistance information is configured and the NAICS assistance information is not configured in the higher layer, the signal detection unit 2043 does not perform interference cancelation or suppression of the PDSCH and cancels the CRS interference based on the CRS assistance information.

Following a control signal input from the control unit 202, the transmission circuitry 203 generates an uplink reference signal, codes and modulates uplink data (transport blocks) input from the higher layer processing circuitry 201, and multiplexes the PUCCH, the PUSCH, and the generated uplink reference signal, followed by transmission to the base-station apparatus 1A via the transceiving antenna 206.

The coding unit 2031 codes uplink control information input from the higher layer processing circuitry 201 by means of convolutional coding, block coding, or the like. In addition, the coding unit 2031 performs turbo coding based on information used for scheduling of the PUSCH.

The modulation unit 2032 modulates a coded bit input from the coding unit 2031 according to a modulation scheme notified in the downlink control information or a modulation scheme predetermined for each channel, such as BPSK, QPSK, 16QAM, or 64QAM.

The uplink reference signal generation unit 2033 generates a sequence obtained according to predetermined rules (formulas), based on a physical cell identity (PCI; also referred to as a Cell ID or the like) for identifying the base-station apparatus 1A, a bandwidth in which the uplink reference signal is arranged, a cyclic shift notified in the uplink grant, values of parameters for generating a DMRS sequence, and the like.

Following a control signal input from the control unit 202, the multiplexing unit 2034 reorders the PUSCH modulation symbols in parallel and then applies the Discrete Fourier Transform (DFT). In addition, the multiplexing unit 2034 multiplexes the PUCCH and PUSCH signals and the generated uplink reference signal for each transmit antenna port. That is, the multiplexing unit 2034 arranges the PUCCH and PUSCH signals and the generated uplink reference signal into resource elements for each transmit antenna port.

The radio transmission unit 2035 applies the Inverse Fast Fourier Transform (IFFT) to the multiplexed signal, performs modulation according to a SC-FDMA scheme, generates SC-FDMA symbols, adds CP to the generated SC-FDMA symbols, generates a digital signal in a baseband, converts the digital signal in the baseband to an analog signal, removes excess frequency components, performs conversion to a carrier frequency by up-conversion, amplifies power, and outputs the resultant to the transceiving antenna 206 for transmission.

A program which runs in the base-station apparatus and the terminal apparatus concerning the invention is a program that controls a CPU and the like (program that causes a computer to function) such that the functions in the aforementioned embodiments concerning the invention are realized. The pieces of information handled by the apparatus are temporarily accumulated in a RAM during the processing thereof, and then stored in various ROMs and HDDs and read, corrected, and written by the CPU when necessary. A recording medium that stores the program therein may be any of a semiconductor medium (for example, a ROM, a nonvolatile memory card or the like), an optical recording medium (for example, a DVD, an MO, an MD, a CD, a BD or the like), a magnetic recording medium (for example, a magnetic tape, a flexible disc or the like), and the like. Moreover, there is also a case where, by executing the loaded program, not only the functions of the aforementioned embodiments are realized, but also by performing processing in cooperation with an operating system, other application programs or the like based on an instruction of the program, the functions of the invention are realized.

When being distributed in the market, the program is able to be stored in a portable recording medium and distributed or be transferred to a server computer connected through a network such as the Internet. In this case, a storage apparatus of the server computer is also included in the invention. A part or all of the terminal apparatus and the base-station apparatus in the aforementioned embodiments may be realized as an LSI which is a typical integrated circuit. Each functional block of a reception apparatus may be individually formed into a chip, or a part or all thereof may be integrated and formed into a chip. When each functional block is made into an integrated circuit, an integrated circuit control unit for controlling them is added.

Further, a method for making into an integrated circuit is not limited to the LSI and a dedicated circuit or a versatile processor may be used for realization. Further, in a case where a technique for making into an integrated circuit in place of the LSI appears with advance of a semiconductor technique, an integrated circuit by the technique is also able to be used.

Note that, the invention of the present application is not limited to the aforementioned embodiments. The terminal apparatus of the present application is not limited to be applied to a mobile station apparatus, but, needless to say, is applicable to stationary or unmovable electronic equipment which is installed indoors or outdoors such as, for example, AV equipment, kitchen equipment, cleaning/washing machine, air conditioning equipment, office equipment, automatic vending machine, other domestic equipment, and the like.

As above, the embodiments of the invention have been described in detail with reference to drawings, but specific configurations are not limited to the embodiments, and a design and the like which are not departed from the main subject of the invention are also included.

INDUSTRIAL APPLICABILITY

The invention is suitably used for a base-station apparatus, a terminal apparatus, and a communication method.

Note that, the present international application claims priority from Japanese Patent Application No. 2014-119166 filed on Jun. 10, 2014, and the entire contents of Japanese Patent Application No. 2014-119166 are hereby incorporated herein by reference.

REFERENCE SIGNS LIST 1A, 1B base-station apparatus
2A, 2B, 2C terminal apparatus
101 higher layer processing circuitry
102 control unit
103 transmission circuitry
104 reception circuitry
105 transceiving antenna
1011 radio resource control unit
1012 scheduling unit
1031 coding unit
1032 modulation unit
1033 downlink reference signal generation unit
1034 multiplexing unit
1035 radio transmission unit
1041 radio reception unit
1042 multiplexing/demultiplexing unit
1043 demodulation unit
1044 decoding unit
201 higher layer processing circuitry
202 control unit
203 transmission circuitry
204 reception circuitry
205 channel state information generation unit
206 transceiving antenna
2011 radio resource control unit
2012 scheduling information interpretation unit
2031 coding unit
2032 modulation unit
2033 uplink reference signal generation unit
2034 multiplexing unit
2035 radio transmission unit
2041 radio reception unit
2042 multiplexing/demultiplexing unit
2043 signal detection unit

The invention claimed is:

1. A base-station apparatus which communicates with a terminal apparatus, the base-station apparatus comprising:
higher layer processing circuitry that configures, to the terminal apparatus, any one of predetermined information and Cell-specific Reference Signal (CRS) assistance information, wherein
the predetermined information comprises information about a Time Division Duplex Uplink/Downlink (TDD UL/DL) configuration,
the CRS assistance information comprises a cell ID and information about the number of antenna ports of a neighbor cell,
the CRS assistance information is information for mitigating interference of a CRS from the neighbor cell by the terminal apparatus, and
in a case of configuring the predetermined information to the terminal apparatus, the higher layer processing circuitry does not configure the CRS assistance information to the terminal apparatus.

2. The base-station apparatus according to claim 1, wherein
the higher layer processing circuitry further configures, to the terminal apparatus, information about a power ratio of Physical Downlink Shared CHannels (PDSCHs) between OFDM symbols, information about a power ratio of a CRS to a PDSCH, and information about a transmission mode, and
the information about the power ratio of the PDSCHs between the OFDM symbols, the information about the power ratio of the CRS to the PDSCH, and the information about the transmission mode are used to cancel or suppress interference.

3. The base-station apparatus according to claim 1, the base-station apparatus further comprising transmission circuitry, wherein
in a case where the higher layer processing circuitry configures the predetermined information to the terminal apparatus and does not configure the CRS assistance information to the terminal apparatus, the transmission circuitry transmits the predetermined information to the terminal apparatus and does not transmit the CRS assistance information to the terminal apparatus.

4. The base-station apparatus according to claim 1, wherein
the higher layer processing circuitry configures the CRS assistance information to the terminal apparatus regardless of whether or not the predetermined information is configured to the terminal apparatus.

5. The base-station apparatus according to claim 4, the base-station apparatus further comprising transmission circuitry, wherein
in a case where the higher layer processing circuitry configures the predetermined information to the terminal apparatus and configures the CRS assistance information to the terminal apparatus, the transmission circuitry transmits the predetermined information and the CRS assistance information to the terminal apparatus, and
the CRS assistance information is transmitted by a RRC message.

6. The base-station apparatus according to claim 1, wherein
the predetermined information further comprises information about a MBSFN subframe configuration.

7. A processing method of a base-station apparatus which communicates with a terminal apparatus, the processing method comprising:
a first step of configuring, to the terminal apparatus, any one of predetermined information and Cell-specific Reference Signal (CRS) assistance information, wherein
the predetermined information comprises information about a Time Division Duplex Uplink/Downlink (TDD UL/DL) configuration,
the CRS assistance information comprises a cell ID and information about the number of antenna ports of a neighbor cell,
the CRS assistance information is information for mitigating interference of a CRS from the neighbor cell by the terminal apparatus, and
the first step comprises that, in a case that the predetermined information is configured to the terminal apparatus, the CRS assistance information is not configured to the terminal apparatus.

8. The processing method according to claim 7, wherein
the processing method further comprises a second step of configuring, to the terminal apparatus, information about a power ratio of Physical Downlink Shared CHannels (PDSCHs) between OFDM symbols, information about a power ratio of a CRS to a PDSCH, and information about a transmission mode, and the information about the power ratio of the PDSCHs between the OFDM symbols, the information about the power ratio of the CRS to the PDSCH, and the information about the transmission mode are used to cancel or suppress interference.

9. The processing method according to claim 7, wherein the processing method further comprises a third step at which, in a case where the predetermined information is configured to the terminal apparatus and the CRS assistance information is not configured to the terminal apparatus, the predetermined information is transmitted to the terminal apparatus and the CRS assistance information is not transmitted to the terminal apparatus.

10. The processing method according to claim 7, wherein the first step comprises configuring the CRS assistance information to the terminal apparatus regardless of whether or not the predetermined information is configured to the terminal apparatus.

11. The processing method according to claim 10, wherein
the processing method comprises a fourth step at which, in a case where the predetermined information is configured to the terminal apparatus and the CRS assistance information is configured to the terminal apparatus, the predetermined information and the CRS assistance information are transmitted to the terminal apparatus, and
the CRS assistance information is transmitted by a RRC message.

12. The processing method according to claim 7, wherein the predetermined information further comprises information about a MBSFN subframe configuration.

13. A terminal apparatus which communicates with a base-station apparatus, the terminal apparatus comprising:
reception circuitry that receives predetermined information or Cell-specific Reference Signal (CRS) assistance information from the base-station apparatus; and
higher layer processing circuitry that configures any one of the predetermined information and the CRS assistance information, wherein
the predetermined information comprises information about a Time Division Duplex Uplink/Downlink (TDD UL/DL) configuration,
the CRS assistance information comprises a cell ID and information about the number of antenna ports of a neighbor cell,
the CRS assistance information is information for mitigating interference of a CRS for the neighbor cell by the terminal apparatus,
the CRS assistance information is transmitted by a RRC message, and
in a case where the predetermined information is configured, the CRS assistance information is not configured.

14. The terminal apparatus according to claim 13, wherein in a case where the reception circuitry further receives, from the base-station apparatus, information about a power ratio of Physical Downlink Shared CHannels (PDSCHs) between OFDM symbols, information about a power ratio of a CRS to a PDSCH, and information about a transmission mode, the higher layer processing circuitry further configures the information about the power ratio of the PDSCHs between the OFDM symbols, the information about the power ratio of the CRS to the PDSCH, and the information about the transmission mode, and the information about the power ratio of the PDSCHs between the OFDM symbols, the information about the power ratio of the CRS and the PDSCH, and the information about the transmission mode are used to cancel or suppress interference.

15. The terminal apparatus according to claim 13, wherein the CRS assistance information is configured regardless of whether or not the predetermined information is configured.

16. The terminal apparatus according to claim 13, wherein the predetermined information further comprises information about a MBSFN subframe configuration.

17. A processing method of a terminal apparatus which communicates with a base-station apparatus, the processing method comprising:
a first step of receiving predetermined information or Cell-specific Reference Signal (CRS) assistance information from the base-station apparatus; and
a second step of configuring any one of the predetermined information and the CRS assistance information, wherein
the predetermined information comprises information about a Time Division Duplex Uplink/Downlink (TDD UL/DL) configuration,
the CRS assistance information comprises a cell ID and information about the number of antenna ports of a neighbor cell,
the CRS assistance information is information for mitigating interference of a CRS from the neighbor cell by the terminal apparatus,
the CRS assistance information is transmitted by a RRC message, and
in a case where the predetermined information is configured, the CRS assistance information is not configured.

18. The processing method according to claim 17, wherein
the processing method further comprises a third step at which, in a case where information about a power ratio of Physical Downlink Shared CHannels (PDSCHs) between OFDM symbols, information about a power ratio of a CRS to a PDSCH, and information about a transmission mode are received from the base-station apparatus, the information about the power ratio of the PDSCHs between the OFDM symbols, the information about the power ratio of the CRS to the PDSCH, and the information about the transmission mode are configured, and
the information about the power ratio of the PDSCHs between the OFDM symbols, the information about the power ratio of the CRS to the PDSCH, and the information about the transmission mode are used to cancel or suppress interference.

19. The processing method according to claim 17, wherein
the CRS assistance information is configured regardless of whether or not the predetermined information is configured.

20. The processing method according to claim 17, wherein
the predetermined information further comprises information about a MBSFN subframe configuration.

* * * * *